(No Model.)

C. J. WAGENER.
RAIL GUARD FOR VEHICLE WHEELS.

No. 515,540. Patented Feb. 27, 1894.

Witnesses
J. F. Reynolds
Chas. D. Hoyer

Inventor
Christian J. Wagener.
By John Wedderburn
Attorney

UNITED STATES PATENT OFFICE.

CHRISTIAN J. WAGENER, OF PITTSBURG, PENNSYLVANIA.

RAIL-GUARD FOR VEHICLE-WHEELS.

SPECIFICATION forming part of Letters Patent No. 515,540, dated February 27, 1894.

Application filed November 7, 1893. Serial No. 490,244. (No model.)

*To all whom it may concern:*

Be it known that I, CHRISTIAN J. WAGENER, a citizen of the United States, and a resident of Pittsburg, in the county of Allegheny and State of Pennsylvania, have invented certain new and useful Improvements in Wheels; and I do hereby declare the following to be a full, clear, and exact description of the invention, such as will enable others skilled in the art to which it appertains to make and use the same.

This invention relates to wheels, and has for its object to provide simple and convenient means in connection with such devices to relieve the strain and the serious results of the twisting action of a wheel in crossing a projecting railroad rail, and also to obviate wear directly on the sides of the wheel in approaching curb-stones or other projections.

With these and other objects in view, the invention consists of the construction and arrangement of the several parts which will be more fully hereinafter described and claimed.

Figure 1:
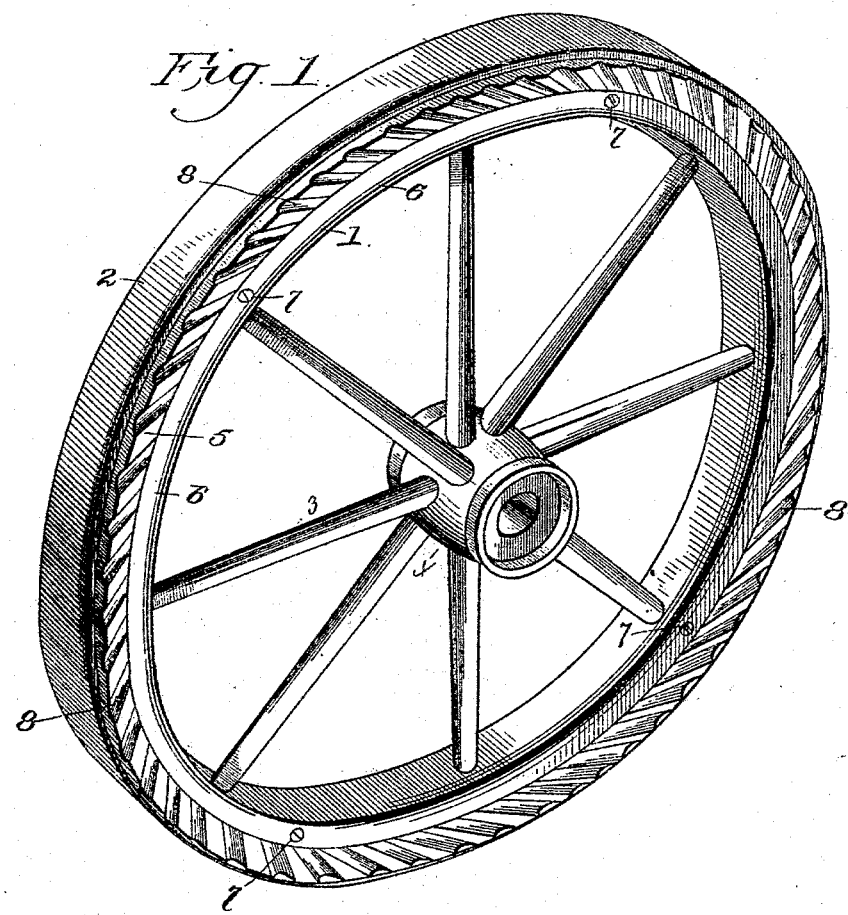
Figure 2:
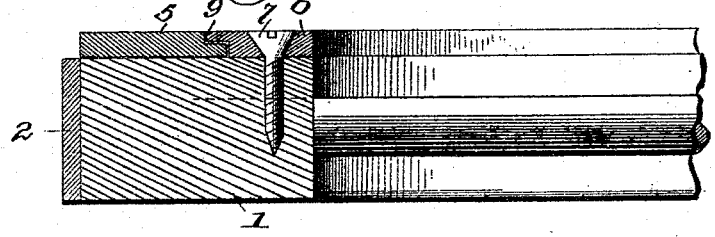

In the drawings:—Figure 1 is a perspective view of a wheel, embodying the invention. Fig. 2 is a section on the line x—x Fig. 1.

Similar numerals of reference are employed to indicate corresponding parts in both figures.

Referring to the drawings, the numeral 1 designates a wheel of ordinary form, comprising a felly 1, a tire 2, spokes 3, and a hub, 4. An annular rim 5 is held against the outer side of the wheel and is free to revolve. The said annular rim is held in place against the outer side of the wheel by an open circular plate 6, through which headed studs or pins 7 pass. The rim 5 in its movement, produces an anti-frictional effect, and the outer edge of the said rim is formed with a series spirally arranged grooves 8, which strike against the projecting portions of the rails with which the wheels may come in contact, or against curbing or other objects, and assist in turning the rim, and obviate the formation of a stationary resisting surface. The inner outer edge of the rim is circumferentially recessed as at 9, and the under outer surface of the plate 6 is similarly recessed to thereby provide means for holding the rim against separation from the wheel. The headed studs or pins, after being passed through the parts which they should secure, are supplied with nuts which hold the same in position.

It will be seen that the construction and arrangement of the several parts will relieve vehicles of the strain both on the axle and the hub of the wheel which is exerted when the wheels strike or are brought to bear against the sides of the heads of the railroad rails in crossing the latter at an acute angle, or in running out of the same after having been traveling therein for some distance. Usually a wheel will slide along against the inner surface of the projecting head of a railroad rail and be prevented, until after some difficulty, in crossing the same. In a great many cases the strain is such that the axle is twisted, and the hub broken, and consequently the wheel will be completely demolished, with the injurious results usually incident to such accidents. By the construction and arrangement heretofore set forth, these disadvantages are obviated, and it will be obviously apparent that many minor changes in the construction and arrangement of the several parts can be made and substituted for those shown and described, without in the least departing from the nature or spirit of the invention.

Having thus described the invention, what is claimed as new is—

1. In combination with a wheel, of an outer rotatable rim, mounted thereon, substantially as described.

2. In combination with a wheel of an outer rotatable rim and an outer plate for holding said rim in position, substantially as described.

3. In combination with a wheel of an outer rotatable rim having grooves in the edge of the same, substantially as described.

In testimony whereof I have signed this specification in the presence of two subscribing witnesses.

CHRISTIAN J. WAGENER.

Witnesses:
CHARLES WAGENER,
CONRAD FAY.